United States Patent Office

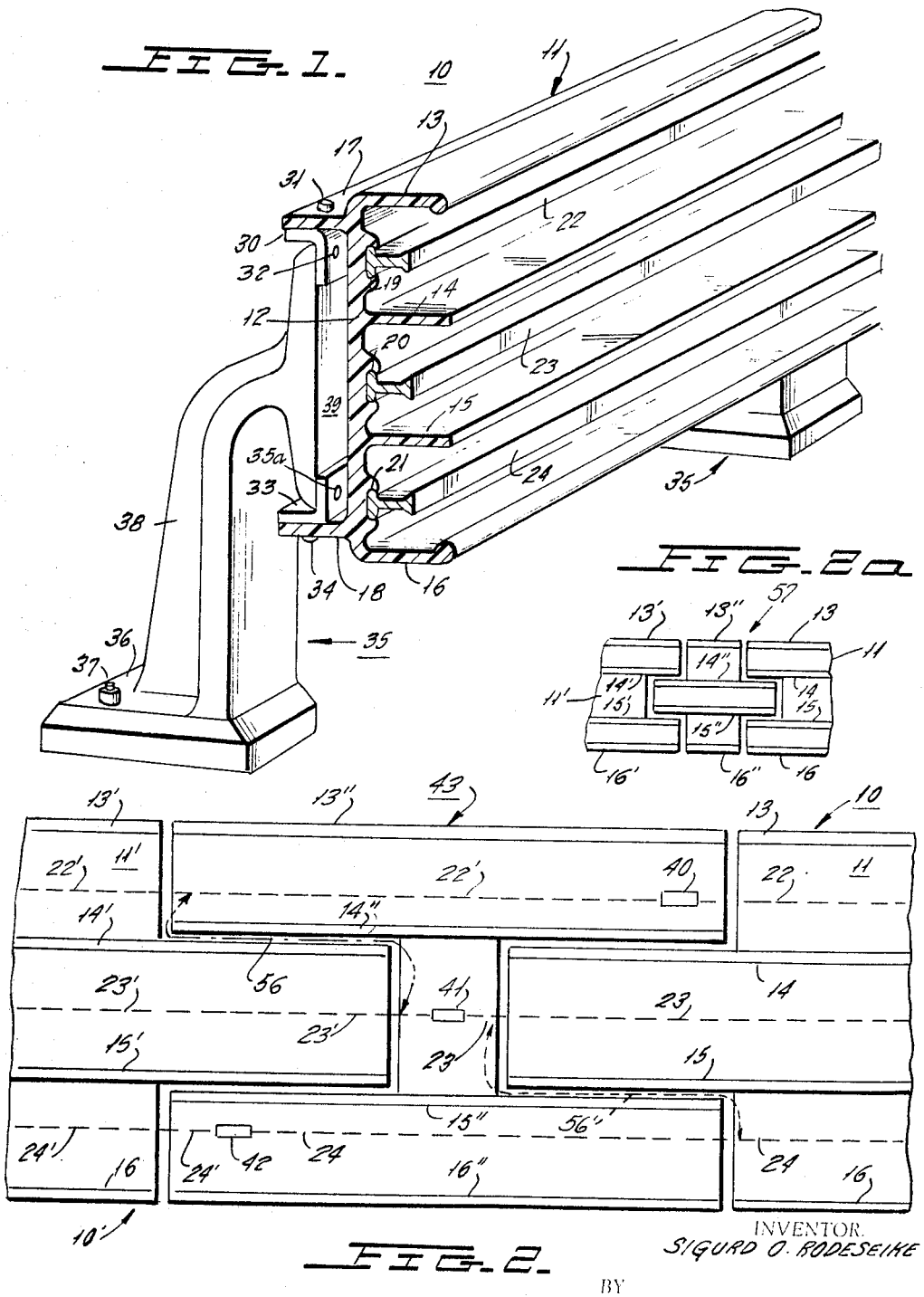

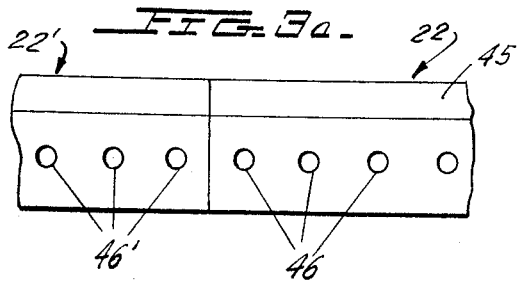
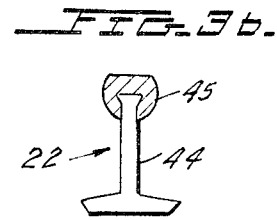
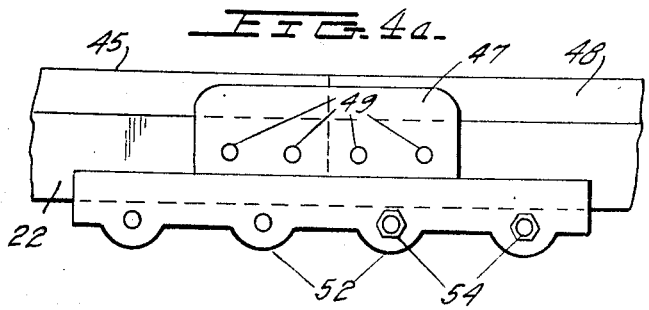
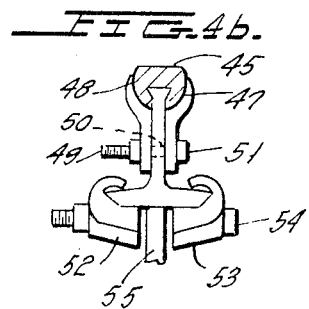
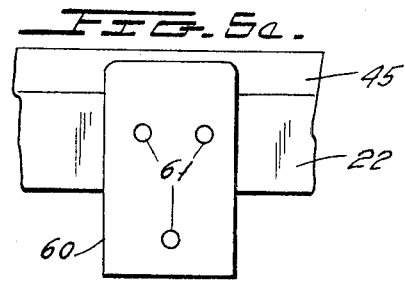
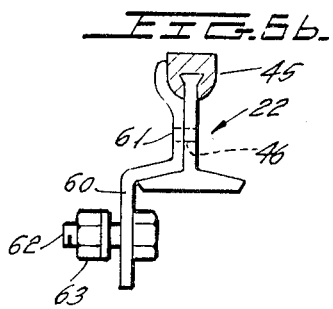
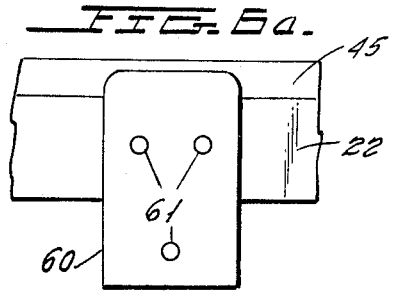
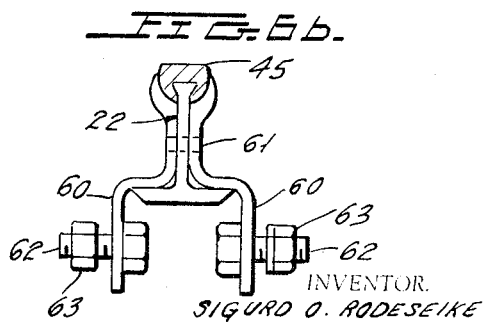
INVENTOR.
SIGURD O. RODESEIKE Oct. 18, 1966
S. O. RODESEIKE
3,280,245
JOINING SYSTEM FOR PLASTIC SUPPORTED AND INSULATED
ELECTRICAL CONDUCTORS
Filed Sept. 29, 1964
3 Sheets-Sheet 3
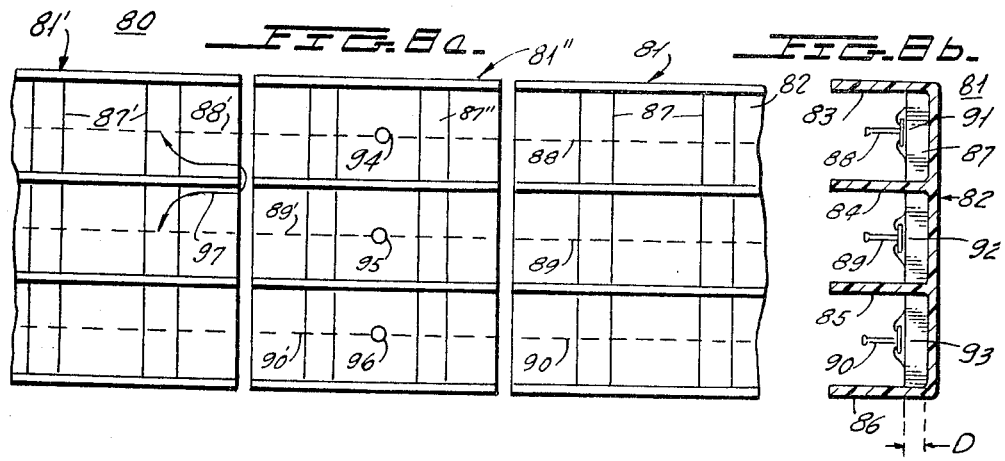
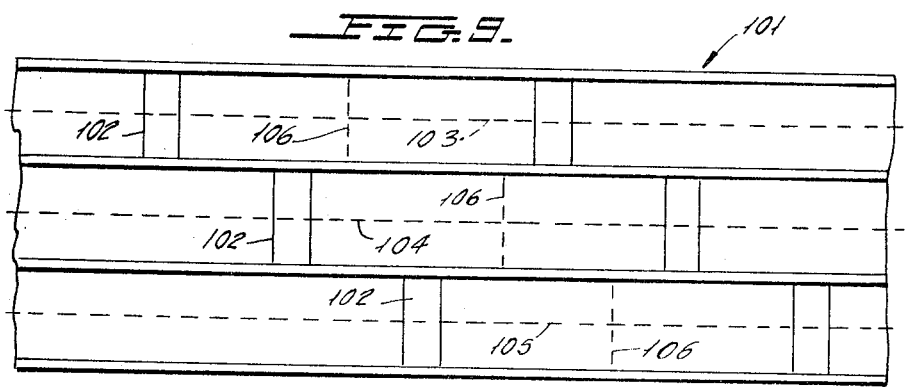
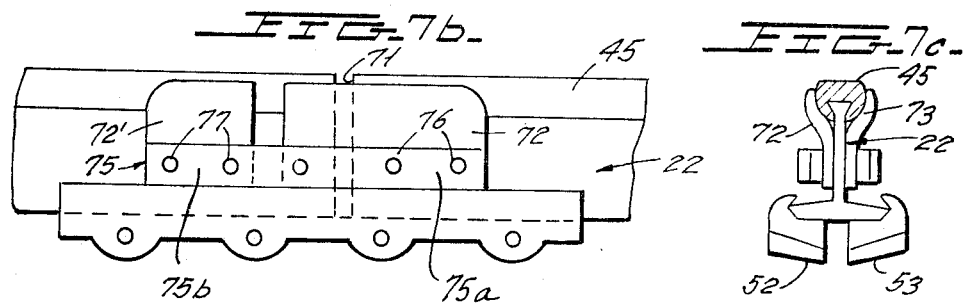
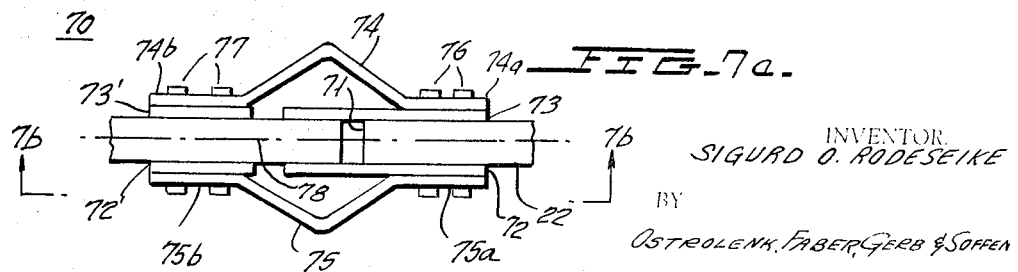
INVENTOR.
SIGURD O. RODESEIKE
BY
OSTROLENK, FABER, GERB & SOFFEN
ATTORNEYS

3,280,245
Patented Oct. 18, 1966

1

3,280,245
JOINING SYSTEM FOR PLASTIC SUPPORTED AND INSULATED ELECTRICAL CONDUCTORS
Sigurd O. Rodeseike, Greensburg, Pa., assignor to I-T-E Circuit Breaker Company, Philadelphia, Pa., a corporation of Pennsylvania
Filed Sept. 29, 1964, Ser. No. 400,080
11 Claims. (Cl. 174—88)

The instant invention relates to joining assemblies and more particularly to novel joining assemblies for use in joining plastic supported and insulated conductors especially those of three-phase A.C. third rail systems so as to provide adequate joining structure and to provide adequate creepage dimensions in the regions where conductor sections are joined together.

Three-phase third rail systems are presently being designed for the purpose of providing three-phase power to electrify a rapid transit system. Such rapid transit systems are being designed with the capabilities of providing transportation service over relatively large areas such as areas having lengths of 75 miles or longer in which the transit cars are designed to operate at speeds of greater than 75 miles per hour and to be capable of rapid acceleration to such cruising speeds. The vibrational power distribution and efficiency problems encountered in such systems have led to the development of three-phase third rail assemblies for electrification of rapid transit systems, which assemblies are set forth in copending applications Serial No. 400,081, filed September 29, 1964, entitled "Metal Protected Voltage Conductor System for Rapid Transit Electrification" by Sigurd O. Rodeseike; and Serial No. 400,048, filed September 29, 1964, entitled "Plastic Insulated High Voltage Conductor System for Rapid Transit Electrification" by Sigurd O. Rodeseike, both of which are assigned to the assignee of the instant invention. The three-phase third rail assemblies described in these copending applications and particularly in copending application Serial No. 400,048, set forth a third rail assembly comprised of an insulating member which acts to position and support three conductors of the three-phase A.C. system in a position arranged to make sliding contact with the shoes of the cars in the rapid transit network. Such an assembly is formed by providing an insulating member of sections such as, for example, 40 foot sections with conductors being provided of substantially the same length which are mounted to the insulating member. Since the three-phase third rail system must be a continuous one, it becomes necessary to provide suitable means for joining adjacent sections.

One of the basic problems which is confronted in the joinder of such sections is that of providing adequate creepage dimensions at the juncture locations.

The instant invention provides a novel arrangement for providing rigid mechanical joinder between adjacent sections of the third rail assembly, while at the same time providing adequate insulation for the conductor system and for providing suitable creepage dimensions.

The instant invention is comprised of forming the facing end portions of each third rail assembly section so that the juncture between associated conductors of each phase are arranged in a staggered fashion with the insulating members of each section likewise being cut in a substantially staggered fashion across the phases. A substantially H-shaped insert is then provided for insertion between the adjacent sections of the three-phase assembly with the insulating insert having insulation barriers which overlap

2 the innerphase barriers of the insulating members in order to maintain full creepage distance between adjacent conductors. The conductor sections are then suitably joined to provide suitable electrical and mechanical connection therebetween. It is further possible to join the adjacent sections of like bus bar phases by rail feeding means which in addition to securing the sections of like phases to one another, act to provide electrical connection between the rails and the feeder source.

Still another embodiment of the instant invention is comprised of providing an insulating support assembly for the conductors of the three-phase A.C. third rail assembly wherein the conductors or bus bars are not connected continuously to the insulating member but are joined to the insulating member at intermittent supports which are arranged at spaced intervals along the assembly. The insulator member may then be cut at a position which is intermediate to the contact and supporting positions in order to maintain the electrical creepage distance between the electrical conductors at the junction between adjacent sections.

In assemblies of the type described herein where metallic bus bars are mounted to plastic insulation systems, suitable provision must be made for thermal expansion of the elements. Since plastic insulation systems normally have different characteristics of thermal expansion from that of metallic conductors, this problem is solved in the instant invention by mounting and securing the bus bars to just one point along the insulating member which acts to rigidly secure the bus bar to the insulating member so as to substantially prevent any appreciative relative motion between the bus bars and the insulation system while at the same time allowing for differences in thermal expansion between the plastic and metallic elements.

It is therefore one object of the instant invention to provide novel means for joining adjacent sections of a conductors system.

Another object of the instant invention is to provide novel means for joining adjacent sections of a multiphase electricification system.

Another object of the instant invention is to provide novel means for joining adjacent sections of a multiphase electrification system comprised of a plurality of bus bars positioned and supported by plastic insulation means.

Another object of the instant invention is to provide novel means for joining adjacent sections of a multiphase electrification system comprised of a plurality of bus bars positioned and supported by plastic insulation means, wherein an insulation means is provided to overlap with the plastic insulation means of adjoining sections to maintain adequate creepage dimensions between adjacent bus bars.

Another object of the instant invention is to provide novel means for joining adjacent sections of a multiphase electrification system comprised of a plurality of bus bars positioned and supported by plastic insulation means wherein an insulation means is provided to overlap with the plastic insulation means of adjoining sections to maintain adequate creepage dimensions between adjacent bus bars and wherein further means are provided for electrically and mechanically joining adjacent sections of the bus bar means.

Another object of the instant invention is to provide novel means for joining adjacent sections of a multiphase electrification system comprised of a plurality of bus bars positioned and supported by plastic insulation means wherein an insulation means is provided to overlap with the plastic insulation means of adjoining sections to maintain adequate creepage dimensions between adjacent bus bars and wherein further means are provided for electrically and mechanically joining adjacent sections of the bus bar means, which joints may further be designed to act as feeder means for connecting power to the bus bars at the junction between adjacent rail sections.

Another object of the instant invention is to provide novel insulation members for use in multiphase electrification systems and the like wherein intermittent support means are provided at spaced intervals along the insulation member to permit adjacent sections to be joined by cutting the insulating member at locations which are intermediate to the support sections in order to maintain electrical creepage distance between the electrical conductors.

These and other objects of the instant invention will become apparent when reading the accompanying description and drawings in which:

FIGURE 1 is a perspective view showing a three-phase third rail assembly which may be joined by the structure of the instant invention to an adjacent third rail assembly.

FIGURE 2 is a top view showing the structure of the instant invention joining two third rail assembly sections of the type shown in FIGURE 1.

FIGURE 2a is a plan view of an alternative embodiment to FIGURE 2.

FIGURES 3a and 3b are side and end views, respectively, showing the conductors of FIGURES 1 and 2 in greater detail.

FIGURES 4a and 4b are side and end views, respectively, of the clamping means 44 joining adjacent sections of conductors.

FIGURES 5a and 5b are side and end views, respectively, of rail feeder means coupled to a conductor assembly.

FIGURES 6a and 6b are side and end views, respectively, of an alternative embodiment for the rail feeder of FIGURES 5a and 5b.

FIGURES 7a, 7b and 7c are top, side and end views, respectively, of expandable joining means for connecting adjacent sections of rail assembly. FIGURE 7b is a view of FIGURE 7a looking in the direction of arrows 7b—7b.

FIGURES 8a is a top view of an alternative bus assembly to that shown in FIGURE 1.

FIGURE 8b is a typical end view of any of the members 81, 81″, 81′ of FIGURE 8a and specifically shows an end view of member 81.

FIGURE 9 is a top view showing still another alternative embodiment for the bus assembly of FIGURES 1 and 8a—8b.

Referring now to the drawings FIGURE 1 shows a typical third rail assembly 10 which may advantageously employ the principles of the instant invention.

The assembly 10 is comprised of an insulating member 11 having a vertically aligned central portion 12 with integrally formed insulation barriers 13–16, all extending in a first direction to provide insulation between adjacent conductors 22–24 as well as providing protection against accidental contact with these conductors.

The central portion 12 is provided with grooves 19–21 for receiving and supporting conductors 22–24, respectively, in the manner shown in the figure. The insulation barriers 14 and 15 provide adequate insulation between adjacent conductors to prevent arcing and these barriers together with the upper and lowermost barriers 13 and 16 cooperate to prevent accidental contact with the conductor members 22–24.

Also integrally formed with the vertically aligned central portion 12 are upper and lower support arms 17 and 18 respectively, which are secured to L-beams 30 and 33, respectively, by the fastening means 31 and 34, respectively. The L-beams 30 and 33, in turn, are secured to the vertical portion 39 of a support member 35 by the fastening means 32 and 35a, respectively. The vertical supports 35 are positioned at spaced intervals along the length of the insulating member 11 and are provided with a base portion 36 for securing the vertical supports to any suitable surface through the fastening means 37. The vertical support 35 is further provided with a reenforcing rib 38 to provide added strength and rigidity to each vertical support.

The conductors 22–24 are disposed so as to have their exposed vertically aligned right-hand surfaces make sliding contact with the shoes (not shown) of a rapid transit car. The three-phase A.C. third rail assembly 10 of FIGURE 1 is arranged to be positioned adjacent the running rails of the transit network.

FIGURE 2 shows the manner in which two adjacent sections 10 and 10′ may be joined. The section 10 has its insulation member 11 cut in such a manner that the central portion bounded by the insulation barriers 14 and 15 extends further towards the left than the portions bounded by the insulation barriers 13–14 and 15–16. The insulation member 11′ is cut in like manner. The associated conductor sections are cut so that the rail sections 22–22′ form a butt joint at 40; the rail sections 23–23′ form a butt joint at 41 and the rail sections 24–24′ form a butt joint at 42.

An insulating member 43 having substantially the identical pattern of the insulation member 11 of FIGURE 1 and being cut to form substantially an H-shaped configuration is then inserted between the sections 10 and 10′ in the manner shown in FIGURE 2.

The conductors, such as, for example, the conductors 22 and 22′ shown in FIGURES 3a and 3b are preferably formed of an extruded steel I-beam 44 having a copper contact tip head 45 cold-bonded thereto. The sections of conductors 22 and 22′ are provided with apertures 46 and 46′ for receiving the clamping means, shown in FIGURES 4a and 4b. The clamping means is comprised of first and second bus bar members 47 and 48, respectively, positioned along opposite sides of the conductors 22 and 22′, as shown in FIGURE 4a and being provided with suitable apertures 49 and 50, respectively, for receiving the fastening means 51. The clamping members mechanically and electrically connect the conductors or bus bars 22 and 22′ and in addition maintain the contact tips 45 of the conductors 22 and 22′ in perfect alignment.

A rail clamp assembly, where needed, is provided and is comprised of first and second clamping members 52 and 53 having suitable apertures for receiving fastening means 54 so as to adequately clamp the rails or conductors 22 and 22′ to any suitable support means such as the support means 55 positioned between the members 52 and 53 as shown in FIGURE 4b. It should be understood that the conductor sections 23–23′ and 24–24′ are provided with similar clamping assemblies with these clamping assemblies being located at the positions 40, 41, and 42, respectively, shown in FIGURE 2.

The insulation barriers 13″–16″ of the insulation member 43 acts to maintain adequate creepage distance between adjacent conductors to provide adequate protection for the third rail assembly in the region where adjacent sections are joined. As shown in FIGURE 2 the lines 56 and 56′ represent the creepage path. With reference to the line 56, it can be seen that the insulation barrier 14′ of insulation member 11′ and the insulation barrier 14″ of insulation member 43 cooperate to prove an extremely long creepage path between the adjacent conductors 23′ and 22′. In a like manner, the insulation barriers 15 and 15″ act to provide an extremely long creepage path (56′) between the conductors 23 and 24. The insert 57 shown in FIGURE 2a, depicts an obvious modification of the insulating member 43 with the insulating members 11′ and 11 being cut in a modified manner, with the result being a provision of creepage paths of equivalent lengths to those shown in FIGURE 2. Other configurations of the insulation member 43 would be obvious from the two embodiments shown in FIGURE 2.

In order to connect the power source to the conductors 22–24 of the third rail assembly 10, the rail feeders of FIGURES 5a–6b may be provided. Considering the arrangement of FIGURES 5a and 5b, there is provided therein a rigid conductive member 60 having apertures 61 which cooperate with apertures 46 provided in the bus bar 22 to secure the member 60 to the bus bar 22. This is done by any suitable fastening means. A third aperture 61 provided in member 60 receives the fastening assembly 63 to which any suitable insulated electrical conductor (not shown) may be connected, in order to connect the power source to its associated conductor. The rail feeder of FIGURES 5a and 5b may be provided to perform the dual functions of acting as a rail feeder and acting as a bus joint by bridging adjacent rail sections in the same manner as the bus joint of FIGURES 4a and 4b.

In the alternative embodiment, shown in FIGURES 6a and 6b, two members 60 are provided on opposite sides of the bus bar 22, each being provided with apertures 61 so as to receive suitable fastening means to fasten member 60 to the bus bar 22. In a like manner, both members 60 are provided with fastening assemblies 63 for connecting suitable insulator conductor means to connect the bus bar 22 to the associated phase of the power source (not shown).

FIGURES 7a–7c depict an expandable bus joint assembly 70 wherein the rail sections 22 and 22' are positioned so that there is a slight gap 71 between their adjacent ends. First and second clamping members 72 and 73 and the first ends 74a and 75a of expandable clamping members 74 and 75 are secured to bus bar 22 by the fastening means 76. The clamping members 72 and 73 bridge both rail or bus bar sections 22 and 22' in the manner shown in FIGURES 7a and 7b so as to provide perfect alignment therebetween. Additional clamping members 72' and 73' together with the opposite ends 74b and 75b of flexible clamping members 74 and 75 are secured to the bus bar 22' by the fastening means 77. The flexible central portions of the flexible clamping members 74 and 75 enable the bus bars 22 and 22' to experience relative motion in a direction along the center line 78, while at the same time providing suitable electrical continuity between the bus bar sections 22 and 22'.

Rail clamps 52 and 53 of FIGURES 4a and 4b, may be employed where needed.

An alternative arrangement for the joint arrangement shown in FIGURE 2, is shown in FIGURES 8a and 8b.

The assembly 80 of FIGURES 8a and 8b is formed of insulating member 81, 81' and 81'' substantially similar to the insulating member 11 of FIGURE 1 in that each member comprises a central portion 82 having insulating barriers 83–86 all extending in a first direction. At spaced intervals along one surface of the central portion 82 there are provided support sections which are raised a distance D above the surface of the central portion 82. It is these raised portions 87 to which the conductors 88–90 are secured in grooves 91–93, respectively, in a manner substantially similar to that shown in FIGURE 1, with the exception that the conductors are spaced from the surface of the central portion 82 of insulating member 81 substantially by the distance D.

To join two sections such as, for example, the sections 81 and 81' the ends of these sections are cut in the manner shown in FIGURE 8a and an insulating member 81'' is inserted between the members 81 and 81' in the manner shown. The bus bars 88–90 and 83'–90' of the sections 81 and 81', respectively, are joined at the locations 94–96, respectively, by coupling means substantially identical to those shown in FIGURES 4a–4b through 7a–7c, depending upon the particular type of joining clamp desired. As can be seen, the insulating members 81 and 81' are cut at a position intermediate the intermittent support sections 87 and 87', respectively, and a like member 81'' is positioned the sections 81 and 81'. The creepage path such as, for example, the creepage path 97 shown in FIGURE 8c which is measured along a continuous surface between the conductors 88' and 89' is of a sufficiently suitable length to provide adaquate creepage distance during typical operating conditions.

FIGURE 9 shows the top view of a plastic member 101 which is substantially similar to the plastic member 81 of FIGURE 8a with the exception that the raised contact portions 102 are arranged in a staggered fashion as between the phases for each conductor 103–105 which are represented by dashed lines in FIGURE 9. In order to join sections of a three-phase third rail assembly of the type 101 the member may be cut along the dashed lines 106 to join adjacent sections with a suitable plastic member insert being provided between adjacent sections in the same manner as described with respect to FIGURES 2 and 8a.

It can be seen from the instant invention that novel joining means for adjacent sections of three-phase third rail systems are provided which simply and reliably join adjacent sections, while maintaining creepage paths of suitable lengths and maintaining the integrity of the insulation structure along the entire length of the third rail network.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Means joining adjacent sections of multiphase conductor assemblies comprising insulation means positioned between the ends of adjacent sections; said insulation means and said adjacent sections having a substantially flat central insulating portion, a plurality of insulation barriers integral with a first side of said central portion arranged in spaced parallel fashion and extending in a first direction; each conductor assembly being positioned between a selected pair of adjacent insulation barriers; clamping means mounted upon said insulation means joining associated conductor assemblies of the adjacent sections on said insulation means; said insulation and adjacent section barriers providing a long creepage path between conductor assemblies of adjacent phases.

2. Means joining adjacent sections of multiphase conductor assemblies comprising insulation means positioned between the ends of adjacent sections; said insulation means and said adjacent sections having a substantially flat central insulating portion, a plurality of insulation barriers integral with a first side of said central portion arranged in spaced parallel fashion and extending in a first direction; each conductor assembly being positioned between a selected pair of adjacent insulation barriers; clamping means mounted upon said insulation means joining associated conductor assemblies of the adjacent sections on said insulation means; said insulation and adjacent section barriers providing a long creepage path between conductor assemblies of adjacent phases; said insulation means having an H-shaped configuration for interlocking with the adjacent sections of multiphase conductor assemblies.

3. Means for joining adjacent sections of multiphase conductor assemblies comprising insulation means positioned between the ends of adjacent sections; said insulation means and said adjacent sections having a substantially flat central portion, a plurality of insulation barriers integral with a first side of said central portion arranged in spaced parallel fashion and extending in a first direction; each conductor assembly being positioned between a selected pair of adjacent insulation barriers; clamping means mounted upon said insulation means joining associated conductor assemblies of the adjacent sections on said insulation means; said insulation and adjacent section barriers providing a long creepage path between conductor assemblies of adjacent phases; said insulation means having a cross-shaped configuration for interlocking with the adjacent sections of multiphase conductor assemblies.

4. Means joining adjacent sections of multiphase conductor assemblies comprising insulation means positioned between the ends of adjacent sections; said insulation means and said adjacent sections having a substantially flat central portion, a plurality of insulation barriers integral with a first side of said central portion arranged in spaced parallel fashion and extending in a first direction; each conductor assembly being positioned between a selected pair of adjacent insulation barriers; clamping means mounted upon said insulation means joining associated conductor assemblies of the adjacent sections on said insulation means; said insulation and adjacent section barriers providing a long creepage path between conductor assemblies of adjacent phases; said insulation means having an H-shaped configuration for interlocking with the adjacent sections of multiphase conductor assemblies; the associated conductor assemblies of adjacent sections being positioned to form a butt joint therebetween; the locations of said butt joints being staggered along the length of the assembly.

5. Means joining adjacent sections of multiphase conductor assemblies comprising insulation means positioned between the ends of adjacent sections; said insulation means and said adjacent sections each having a substantially flat central portion, a plurality of insulation barriers integral with a first side of said central portion arranged in spaced parallel fashion and extending in a first direction; each conductor assembly being positioned between a selected pair of adjacent insulation barriers; the first side of said central portion having individually formed substantially flat raised surface portions aligned transverse to said barriers and being arranged at spaced intervals along the length of said central portion for engagement with the conductor assembly of the associated phase; said raised surface portions maintaining the conductor assemblies a predetermined distance away from said central portion first surface.

6. Means joining adjacent sections of multiphase conductor assemblies comprising insulation means positioned between the ends of adjacent sections; said insulation means and said adjacent sections each having a substantially flat central portion, a plurality of insulation barriers integral with a first side of said central portion arranged in spaced parallel fashion and extending in a first direction; each conductor assembly being positioned between a selected pair of adjacent insulation barriers; the first side of said central portion having individually formed substantially flat raised surface portions aligned transverse to said barriers and being arranged at spaced intervals along the length of said central portion for engagement with the conductor assembly of the associated phase; said raised surface portions maintaining the conductor assemblies a predetermined distance away from said central portion first surface; the raised portions for all phases of said insulation means being in alignment with one another.

7. Means joining adjacent sections of multiphase conductor assemblies comprising insulation means positioned between the ends of adjacent sections; said insulation means and said adjacent sections each having a substantially flat central portion, a plurality of insulation barriers integral with a first side of said central portion arranged in spaced parallel fashion and extending in a first direction; each conductor assembly being positioned between a selected pair of adjacent insulation barriers; the first side of said central portion having individually formed substantially flat raised surface portions aligned transverse to said barriers and being arranged at spaced intervals along the length of said central portion for engagement with the conductor assembly of the associated phase; said raised surface portions maintaining the conductor assemblies a predetermined distance away from said central portion first surface; the raised surface portions for all phases of said insulation means being staggered relative to one another.

8. Means joining adjacent sections of multiphase conductor assemblies comprising insulation means positioned between the ends of adjacent sections; said insulation means and said adjacent sections each having a substantially flat central portion, a plurality of insulation barriers integral with a first side of said central portion arranged in spaced parallel fashion and extending in a first direction; each conductor assembly being positioned between a selected pair of adjacent insulation barriers; the first side of said central portion having individually formed substantially flat raised surface portions aligned transverse to said barriers and being arranged at spaced intervals along the length of said central portion for engagement with the conductor assembly of the associated phase; said raised surface portions maintaining the conductor assemblies a predetermined distance away from said central portion first surface; the associated conductor assemblies of adjacent sections being positioned to form a butt joint therebetween; the locations of said butt joints being staggered along the length of the assembly.

9. Means joining adjacent sections of multiphase conductor assemblies comprising multiphase conductor assemblies and insulation means positioned between the ends of adjacent sections of said multiphase conductor assemblies;

said insulation means and said adjacent sections each having a substantially flat central portion of insulating material, a plurality of insultion barriers integral with a first side of said central portion arranged in spaced parallel fashion and extending in a first direction;

each conductor assembly being positioned between a pair of adjacent insulation barriers;

said insulation means having an H-shaped configuration;

the adjacent ends of said adjacent sections being cut to form a configuration for interlocking with the H-shaped configuration of said insulation means;

the barriers of said insulation means and said adjacent sections being arranged to provide a long creepage path between conductor assemblies of adjacent phases.

10. Means joining adjacent sections of multiphase conductor assemblies comprising multiphase conductor assemblies and insulation means positioned between the ends of adjacent sections of said multiphase conductor assemblies;

said insulation means and said adjacent sections each having a substantially flat central portion of insulating material, a plurality of insulation barriers integral with a first side of said central portion arranged in spaced parallel fashion and extending in a first direction;

each conductor assembly being positioned between a pair of adjacent insulation barriers;

said insulation means having a cross-shaped configuration;

the adjacent ends of said adjacent sections being cut to form a configuration for interlocking with the cross-shaped configuration of said insulation means;

the barriers of said insulation means and said adjacent sections being arranged to provide a long creepage path between conductor assemblies of adjacent phases.

11. Means for joining adjacent sections of multiphase conductor assemblies comprising at least two adjacent sections and insulation means positioned between the ends of adjacent sections;

said adjacent sections and said insulation means each having a substantially flat central portion of insulating material, a plurality of insulation barriers integral with the first side of said central portion arranged in spaced parallel fashion and extending in a first direction;

each conductor assembly being positioned between a neighboring pair of insulation barriers;

insulation barriers of said adjacent sections being substantially in alignment with associated insulation barriers of said insulation means;

the first side of said insulation means and adjacent sections central portion each having individually formed substantially flat raised surface portions aligned transverse to said barriers and being arranged at spaced intervals along the length of the central portions for engagement with an associated conductor assembly;

said raised surface portions maintaining the conductor assemblies a predetermined distance away from said central portion first surface.

References Cited by the Examiner

UNITED STATES PATENTS

| | | | |
|---|---|---|---|
| 434,076 | 8/1890 | Zopke | 174—72 |
| 502,083 | 7/1893 | McEvoy | 174—97 X |
| 1,982,152 | 11/1934 | De Mask | |

FOREIGN PATENTS 594,896  11/1947  Great Britain.

OTHER REFERENCES

Geyer: German application No. S 29,562, published 1/5/56.

LARAMIE E. ASKIN, *Primary Examiner.*